United States Patent
Harper et al.

(10) Patent No.: US 9,676,658 B2
(45) Date of Patent: *Jun. 13, 2017

(54) METHOD OF MAKING UPDOPED CLADDING BY USING SILICON TERTRACHLORIDE AS THE DOPANT

(71) Applicant: Corning Incorporated, Corning, NY (US)

(72) Inventors: Brian Lee Harper, Wilmington, NC (US); Rostislav Radiyevich Khrapko, Corning, NY (US); Snigdharaj Kumar Mishra, Wilmington, NC (US); Sonya Marie Raney, Wrightsville Beach, NC (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/997,780

(22) Filed: Feb. 15, 2016

(65) Prior Publication Data

US 2016/0152510 A1   Jun. 2, 2016

Related U.S. Application Data

(63) Continuation of application No. 14/467,369, filed on Aug. 25, 2014, now Pat. No. 9,290,405.

(60) Provisional application No. 61/874,555, filed on Sep. 6, 2013.

(51) Int. Cl.
*C03C 13/04* (2006.01)
*C03B 37/014* (2006.01)

(52) U.S. Cl.
CPC ...... *C03B 37/01446* (2013.01); *C03B 37/014* (2013.01); *C03B 37/01453* (2013.01); *C03C 13/045* (2013.01); *C03B 2201/08* (2013.01); *C03B 2201/12* (2013.01); *C03B 2201/20* (2013.01); *C03B 2201/31* (2013.01); *C03B 2203/22* (2013.01); *C03B 2203/23* (2013.01); *C03B 2203/26* (2013.01); *C03C 2201/11* (2013.01); *C03C 2201/20* (2013.01)

(58) Field of Classification Search
CPC ...... C03C 13/04; C03B 37/014; C03B 37/018
USPC .......................................................... 65/399
See application file for complete search history.

(56) References Cited

U.S. PATENT DOCUMENTS

| | | | |
|---|---|---|---|
| 5,740,297 A | 4/1998 | Onishi et al. | |
| 6,116,055 A | 9/2000 | Ishikawa et al. | |
| 7,752,869 B2 | 7/2010 | Otosaka et al. | |
| 7,752,870 B1 | 7/2010 | Homa | |
| 9,290,405 B2 * | 3/2016 | Harper | C03B 37/01446 |
| 2003/0056549 A1 | 3/2003 | de Sandro et al. | |
| 2003/0221459 A1 | 12/2003 | Walczak | |

FOREIGN PATENT DOCUMENTS

| | | |
|---|---|---|
| DE | 102012007520 B3 | 8/2013 |
| EP | 0851247 A2 | 12/1997 |
| JP | 2000063147 | 2/2000 |

* cited by examiner

*Primary Examiner* — Mark Halpern
(74) *Attorney, Agent, or Firm* — Svetlana Z. Short

(57) ABSTRACT

One embodiment of the disclosure relates to a method of making an optical fiber comprising the steps of: (i) exposing a silica based preform with at least one porous glass region having soot density of $\rho$ to a gas mixture comprising $SiCl_4$ having $SiCl_4$ mole fraction $y_{SiCl4}$ at a doping temperature $T_{dop}$ such that parameter X is larger than 0.03 to form the chlorine treated preform, wherein $$X = \frac{1}{1 + \left[\left(\frac{\rho}{\rho_s - \rho}\right) \frac{0.209748\, T_{dop} \mathrm{Exp}[-5435.33/T_{dop}]}{y_{SiCl4}^{3/4}}\right]}$$

and $\rho_s$ is the density of the fully densified soot layer; and (ii) exposing the chlorine treated preform to temperatures above 1400° C. to completely sinter the preform to produce sintered optical fiber preform with a chlorine doped region; and (iii) drawing an optical fiber from the sintered optical preform.

12 Claims, 4 Drawing Sheets

METHOD OF MAKING UPDOPED CLADDING BY USING SILICON TERTRACHLORIDE AS THE DOPANT

This application is a continuation of U.S. application Ser. No. 14/467,369 filed on Aug. 25, 2014 which claims the benefit of priority to U.S. application Ser. No. 61/874,555 filed on Sep. 6, 2013, the contents of which are relied upon and incorporated herein by reference in its entirety.

BACKGROUND

The present invention relates to optical fibers, and more specifically to optical fibers having a cladding updoped by silicon tertrachloride.

No admission is made that any reference cited herein constitutes prior art. Applicant expressly reserves the right to challenge the accuracy and pertinency of any cited documents.

SUMMARY

One embodiment of the disclosure relates to a method of making an optical fiber preform comprising the steps of:
(i) exposing a silica based preform with at least one porous glass region having soot density of ρ to a gas mixture comprising $SiCl_4$ having $SiCl_4$ mole fraction $y_{SiCl4}$ (for example, of less than 0.03) at a doping temperature $T_{dop}$ such that parameter X is larger than 0.03 to form the chlorine treated preform, wherein $$X = \frac{1}{1 + \left[\left(\frac{\rho}{\rho_s - \rho}\right)\frac{0.209748\, T_{dop} \text{Exp}[-5435.33/T_{dop}]}{y_{SiCl4}^{3/4}}\right]}$$

and $\rho_s$ is the density of the fully densified soot layer and $\rho < \rho_s$; and
(ii) exposing the chlorine treated preform to temperatures above 1400° C. to completely sinter the preform to produce sintered optical fiber preform with a chlorine doped region having a chlorine doped. In the embodiments disclosed herein $\rho < 0.8$ gm/cm³, preferably $\rho < 0.6$ gm/cm³, for example $\rho < 0.6$ gm/cm³, and in some embodiments $\rho < 0.5$ gm/cm³.

According to some embodiments $0.005 < y_{SiCl4} < 0.03$. According to some embodiments $X > 0.04$. According to some embodiments $0.3$ gm/cm³ $< \rho < 1$ gm/cm³ and $2.1$ gm/cm³ $< \rho_s < 2.3$ gm/cm³, for example $\rho_s = 2.2$ gm/cm³. In some embodiments $0.3$ gm/cm³ $< \rho < 0.8$ gm/cm³, for example $0.35$ gm/cm³ $< \rho < 0.6$ gm/cm³ and $2.15$ gm/cm³ $< \rho_s < 2.25$ gm/cm³. In some embodiments $T_{dop}$ is less than 1225° C. In some embodiments 1000° C. $< T_{dop} < 1200°$ C., and in some embodiments $T_{dop} < 1175°$ C.

According to some embodiments the chlorine doping profile of the chlorine doped region is such that the ratio of the concentration of doped chlorine in the inner portion of the Cl doped region to concentration of doped chlorine in the outer portion of the Cl doped region is >0.75. According to some embodiments the mole fraction of $SiCl_4$ in the gas mixture $y_{SiCl4}$ is larger than 0.005. According to some embodiments the mole fraction of $SiCl_4$ in the gas mixture $y_{SiCl4}$ is larger than 0.015.

According to some embodiments a method of making an optical fiber preform comprises the steps of:
(i) exposing a silica based preform with at least one porous glass region having soot density of ρ to a gas mixture comprising $SiCl_4$ having $SiCl_4$ mole fraction $y_{SiCl4}$ at a doping temperature $T_{dop}$ such that parameter X is larger than 0.03 to form a chlorine treated preform, wherein $$X = \frac{1}{1 + \left[\left(\frac{\rho}{\rho_s - \rho}\right)\frac{0.21\, T_{dop} \text{Exp}[-5435.33/T_{dop}]}{y_{SiCl4}^{3/4}}\right]}$$

and $\rho_s$ is the density of the fully densified soot layer, and the inside of the soot layer (e.g., at least a 1 mm wide inner most portion of this layer during this $SiCl_4$ exposure step) is at a temperature $T_{inside}$ that is at least 25° C. higher than the doping temperature $T_{dop}$ (ii) exposing the chlorine treated preform to temperatures above 1400° C. to completely sinter the preform to produce sintered optical fiber preform with a chlorine doped region having a chlorine doped profile.

According to some embodiments a method of making an optical fiber preform comprises the steps of:
(i) exposing a silica based preform with at least one porous glass region having soot density of ρ to a gas mixture comprising $SiCl_4$ at a doping temperature $T_{dop}$ such that $SiCl_4$ mole fraction $y_{SiCl4}$ at the end of the $SiCl_4$ exposure step is at least 1.5 times the $SiCl_4$ mole fraction at the beginning of the $SiCl_4$ exposure step; and
(ii) wherein exposing of the silica based preform with at least one porous glass region having soot density of ρ to a gas mixture comprising $SiCl_4$ having $SiCl_4$ mole fraction $y_{SiCl4}$ is performed at a doping temperature $T_{dop}$ such that parameter X is larger than 0.03 to form the chlorine treated preform, wherein $$X = \frac{1}{1 + \left[\left(\frac{\rho}{\rho_s - \rho}\right)\frac{0.21\, T_{dop} \text{Exp}[-5435.33/T_{dop}]}{y_{SiCl4}^{3/4}}\right]}$$

and $\rho_s$ is the density of the fully densified soot layer, and the inside of the soot layer (for example, at least a 1 mm wide inner most portion of this layer during this exposure step) is at a temperature $T_{inside}$ that is at least 25° C. higher than the doping temperature $T_{dop}$
(iii) exposing the chlorine treated preform to temperatures above 1400° C. to completely sinter the preform to produce sintered optical fiber preform with a chlorine doped region having a chlorine doped profile.

According to some embodiments the method of making an optical fiber preform comprises the steps of:
(ii) exposing a silica based preform with at least one porous glass region having soot density of ρ to a gas mixture comprising $SiCl_4$ at a doping temperature $T_{dop}$ such that $SiCl_4$ mole fraction $y_{SiCl4}$ at the end of the $SiCl_4$ exposure step is at least 1.5 times the $SiCl_4$ mole fraction at the beginning of the $SiCl_4$ exposure step; and
(ii) exposing the chlorine treated preform to temperatures above 1400° C. to completely sinter the preform to produce sintered optical fiber preform with a chlorine doped region having a chlorine doped profile.

According to some embodiments the method of making an optical fiber preform comprises the steps of:
(i) exposing a silica based preform with at least one porous glass region having soot density of $\rho < 0.8$ gm/cm³ to a gas mixture comprising $SiCl_4$ having $SiCl_4$ mole fraction $y_{SiCl4}$ of less than 0.03 at a doping temperature $T_{dop}$<1225° C.; and (ii) exposing the chlorine treated preform to temperatures above 1400° C. to completely sinter the preform to produce sintered optical fiber preform with a chlorine doped region having a chlorine doped profile.

Additional features and advantages will be set forth in the detailed description which follows, and in part will be readily apparent to those skilled in the art from the description or recognized by practicing the embodiments as described in the written description and claims hereof, as well as the appended drawings It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Additional features and advantages will be set forth in the detailed description which follows and will be apparent to those skilled in the art from the description or recognized by practicing as described in the following description together with the claims and appended drawings.

Various embodiments will be further clarified by the following example(s).

Figure 1:
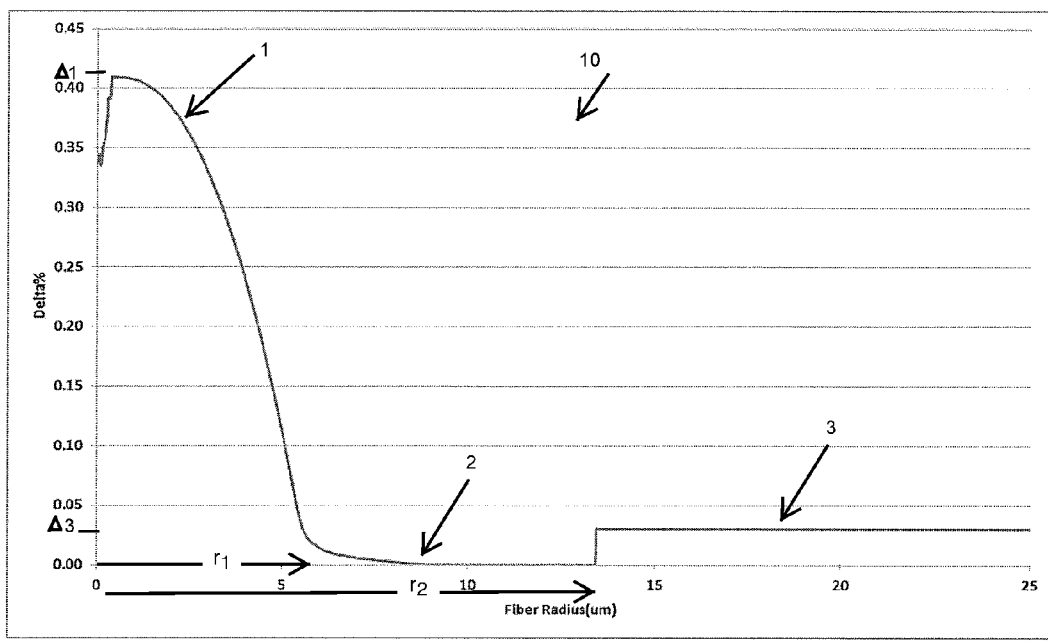
FIG. 1 illustrates refractive index profile of an embodiment of an optical fiber as disclosed herein.

One exemplary fiber embodiment 10 is shown in FIG. 1, includes a central glass core region 1 comprising maximum refractive index delta percent $\Delta_1$. A first inner cladding region—i.e., the depressed inner cladding region 2 surrounds central core region 1, the first inner cladding region 2 (also referred to as a trench herein) comprising refractive index delta percent $\Delta_2$. Outer cladding region 3 surrounds first inner cladding region 2 and comprises $\Delta_3$. In preferred embodiments, $\Delta_1 > \Delta_3 > \Delta_2$. In the embodiment illustrated in FIG. 1, regions 1, 2, 3 are immediately adjacent to one another. However, this is not required, and alternatively additional core or cladding regions may be employed. For example, another inner cladding region (not shown) may be employed which is situated between the core region 1 and inner cladding region 2.

Central core region 1 comprises an outer radius $r_1$ which is defined as where a tangent line drawn through maximum slope of the refractive index of central core region 1 crosses the zero delta line. Core region 1 preferably exhibits a refractive index delta percent, $\Delta_1(\%)$, between about 0.3 to 0.7 (relative to pure silica), and in some embodiments between about 0.3 to 0.5. In some embodiments, $\Delta_1$ (%) is preferably between 0.38 and 0.42. Core radius $r_1$ is preferably between 3 and 10 microns, more preferably between about 4.0 to 7.0 microns. Central core region 1 may comprise a single segment, step index profile. Alternatively, in some embodiments, central core region 1 exhibits an alpha greater than 0.5 and less than 10, and in some embodiments less than 7.5, less than 6, or less than 4. In some preferred embodiments, central core region 1 exhibits an alpha less than 7.5, less than 5, or less than.

In the embodiment illustrated in FIG. 1, inner cladding region 2 surrounds central core region 1 and comprises inner radius $r_1$ and outer radius $r_2$, where $r_1$ being defined as above and $r_2$ being defined as where the refractive index profile curve crosses the zero delta line. In some cases the refractive index in region 2 is essentially flat. In some embodiments, the first inner cladding region contains fluorine. In some embodiments, the first inner cladding region contains less than 0.02 wt % fluorine. In some embodiments, the inner cladding region 2 is pure silica. The inner cladding region 2 preferably exhibits a width between about 3 to 13 microns, more preferably 4 to 12 microns, even more preferably between about 7 to 9 microns. In some embodiments, $R_2$ is greater than 9 microns, or greater than 10 microns and less than 15 microns.

Outer cladding region 3 surrounds the depressed annular region 2 and comprises refractive index delta percent $\Delta_3$ which is higher than the index $\Delta_2$ of inner cladding region 2, thereby forming a region which is an "updoped" outer cladding region 3 with respect to inner cladding region 2, by adding chlorine sufficient to increase the refractive index of the outer cladding region. Thus, outer cladding region 3 comprises a higher refractive index than inner cladding region 2, and preferably comprises refractive index delta percent $\Delta_3$ which is greater than 0.005%, preferably at least 0.001%, for example at least 0.015%, 0.02%, 0.03%, 0.05%.

In some fiber embodiments, the third annular region (also referred to herein as outer cladding layer or outer cladding region 3) comprises chlorine (Cl) in an amount greater than 1000 ppm or more, and in some embodiments preferably greater than 1500 ppm, and, in some embodiments, most preferably greater than 2000 ppm (0.2%) by weight (e.g., 2200 ppm, 2500 ppm, 3000 ppm, 4000 ppm, 5000 ppm, 6000 ppm, 10000 ppm, or there between). Chlorine concentration is described herein in units of parts per million by weight (abbreviated as ppm wt. or ppm, herein). It has been determined that 10000 ppm (1 wt %) chlorine increases the index of the outer cladding by about 0.1% delta.

The optical fibers 10 disclosed herein may be drawn from consolidated optical fiber preforms 100 using known fiber draw methods and apparatus. The preforms 100 are made by: (i) creating a silica soot preform 100A comprising of core region 1 and inner clad region 2, sintering it to glass and producing a preform 100C comprising the core region 1 (which corresponds to the core region 1 of the fiber) and the first inner cladding region 2 (trench region, which corresponds to the inner cladding region 2 of the fiber); (iii) overcladding the resultant sintered preform 100C with silica soot layer, then exposing silica soot layer overclad to a chlorine dopant precursor to dope it with chlorine (e.g., $SiCl_4$ exposure step) to form preform 100D with chlorine doped outer soot layer, and finally sintering the chlorine doped soot layer to glass to create the final preform 100 with an outer cladding region 3. The soot layer is formed by the deposition of pyrogenically generated silica soot particles. According the following embodiments, the soot layers described herein have a deposit density of less than 0.8 $gm/cm^3$, more preferably less than 0.7 $gm/cm^3$, and even more preferably less than 0.6 $gm/cm^3$.

More specifically, silica soot can be made by flame hydrolysis or flame combustion process known to one skilled in the art. To produce pure silica soot, high purity silicon containing precursor compounds (e.g., silicon tetrachloride, octamethylcyclotetrasiloxane, etc.) are introduced into a flame (e.g., the flame of the burner), for example an oxygen-hydrocarbon, or oxygen-hydrogen flame to form "seeds" of solid silicon dioxide, called silica soot. Silica soot is then deposited onto a bait rod or on layer glass (either porous or completely sintered) to form a porous soot layer (porous silica glass layer) with the porosity of less than of less than 0.8 $gm/cm^3$, more preferably less than 0.7 $gm/cm^3$, and even more preferably less than 0.6 $gm/cm^3$. Typically the average size of silica soot particles is in a submicron range with soot particle sizes ranging between 10 nm and 0.5 um. An non exhaustive list of examples of diameters of soot particles utilized here in are 0.01 μm, 0.05 um, 0.075 μm, 0.1 μm, and 0.2 μm. Typical soot particles (silica based soot) have a surface areas of more than about 5 $m^2/g$ ($meter^2$ per gram of sample) or higher and less than 50 $m^2/g$, for example 10 $m^2/g$, 20 $m^2/g$, 30 $m^2/g$ or 40 $m^2/g$. That is, silica soot is sub-micron particles of silica generated by in the flame by oxidation or/or hydrolysis. Silica based soot may contain other dopants, for example if another precursor such as Ge containing precursor or another dopant is also provided to the oxygen fed flame. The manufacture of cylindrical bodies of synthetic vitreous silica is a well-known process of great importance in the production of optical fibers. One of the most widely used techniques is the so-called Outside Vapor Deposition (OVD) process, in which silica soot is generated in the flame of one or more burners fed with a chosen silica precursor, usually in the form of vapor but sometimes in the form of an aerosol spray. The precursor is converted in the flame by oxidation or hydrolysis into a stream of nanoparticles of silica (silica soot), and this stream is directed at a rotating substrate or mandrel on which the particles collect as a porous silica soot body (soot layer).

The optical fiber preform's inner cladding region 2 may optionally be doped with fluorine. That is, the preform layers corresponding to the fiber's core and the trench region of the cladding are deposited as a soot to create a soot preform 100A (for example by the OVD process), and the optional fluorine doping of at least the preform portion corresponding to the trench region 2 is performed in a single step from outside, preferably at temperatures at below 1300° C., more preferably below 1290° C., with fluorine precursor (for example with $SiF_4$, $CF_4$, $C_2F_6$, and/or $SF_6$) to produce a preform 100B with a F-doped region. (Alternatively, as described above, the inner cladding region 2 of the preform can be made of essentially pure silica—in this case fluorine doping step is unnecessary.) The preform 100B is then consolidated to full densification to form preform 100C, overclad with silica soot layer, and then exposed to a chlorine dopant precursor (e.g., $SiCl_4$ exposure) to dope the silica soot layer overclad with chlorine (thus forming preform 100D with Cl doped outer soot layer) and, finally, sintering the chlorine doped soot layer to glass to create the final preform 100 with an outer cladding region 3. In the embodiments disclosed herein the chlorine doping of the outer cladding region 3 is achieved by exposing an optical preform with at least one soot layer to a chlorine dopant during the pre-heat and prior to the sintering part of the consolidation process.

More specifically, according to at least some embodiments the outer cladding layer 3 is created to by depositing silica soot onto the optical fiber preform 100C or by or by placing a silica soot sleeve around the optical fiber preform 100C, and doping of optical fiber preform's region 3 with $SiCl_4$ as the chlorine dopant at temperatures between 1000° C. and 1250° C. (e.g., 1025° C. 1225° C.), preferably 1050° C.-1175° C. to make the optical fiber preform 100D, which is then consolidated to a final optical fiber preform 100. The final preform 100 is utilized to draw optical fiber 10 for use in telecommunication or other systems.

It has been determined that in order to get good quality glass that is essentially free of seeds, haze and defects, in one exemplary embodiment, the process for chlorine doping of the preform's region 3 comprises: (i) exposure of the soot layer to $SiCl_4$ at furnace temperatures of less than 1225° C. and preferably less than 1200° C. (temperature at which no significant densification takes place), (ii) followed by sintering/consolidation of the $SiCl_4$ exposed soot later at temperatures above 1400° C. in a gas environment having $SiCl_4$ mole fraction that is between 0 to 0.005. That is, preferably chlorine doping/exposure with $SiCl_4$ is done at temperatures below 1220° C. and more preferably below 1200° C. during the doping step, with the sintering of the Cl doped soot layer performed in an environment that is essentially free of $SiCl_4$ at temperatures above 1400° C., which significantly improves the quality of the resultant preform.

In some embodiments, small amount of $SiCl_4$ may be added in the sintering step to suppress the loss of doped chlorine at high temperatures encountered during sintering (>1400° C.), with the $SiCl_4$ concentration in the sintering step is less than 0.25 of the $SiCl_4$ concentration in the doping step, more preferably less than 0.2 of the $SiCl_4$ concentration in the doping step, and even more preferably less than 0.1 of the $SiCl_4$ concentration in the doping step.

The chlorine doping of the outer cladding region 3 may also be achieved by exposing a soot preform to a chlorine dopant during the sintering part of the consolidation process. One of the dopants that is very efficient in doping chlorine is silicon tertrachloride ($SiCl_4$). However, because of the high reactivity of $SiCl_4$ as a dopant, diffusional limitations can set in resulting in non-unifomities in radial and axial chlorine doping levels, particularly when chlorine doping soot layers with thickness greater than 6 cm that are used in low cost, large scale manufacturing. The non-uniformities in radial and axial chlorine doping levels are undesirable as these negatively impact optical fiber product performance and attributes. Applicants discovered combinations of doping temperatures and $SiCl_4$ concentrations that surprisingly result in uniform axial and radial chlorine doping profiles in soot layers which are part of large optical fiber preform.

Figure 2:
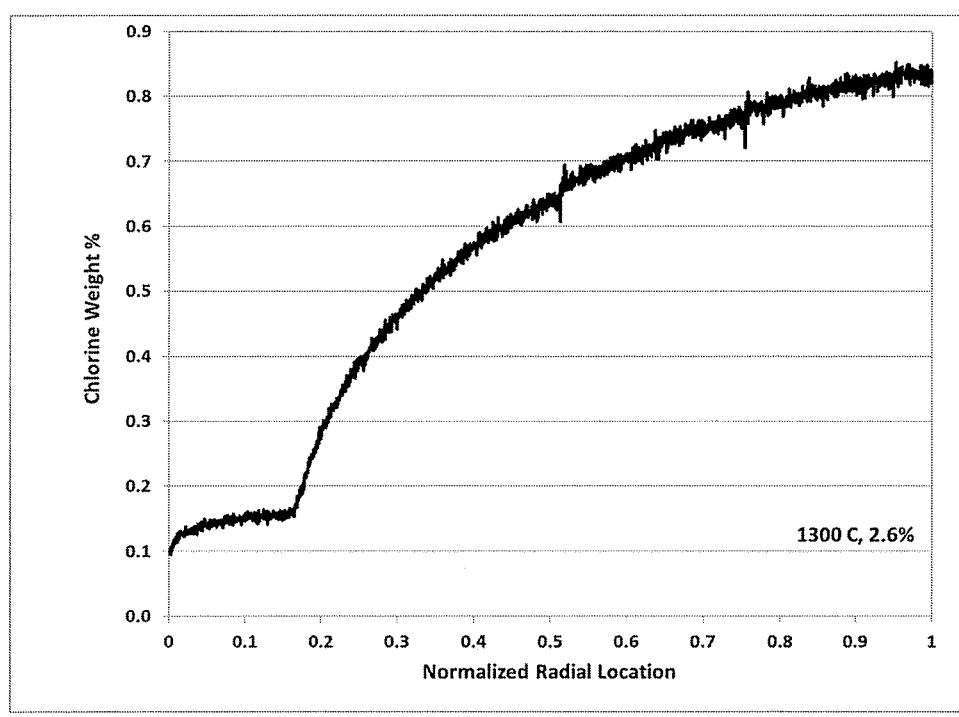
FIG. 2 is a plot of chlorine concentration of the optical preform layer manufactured by exposing a silica soot layer to a gas mixture having $SiCl_4$ mole fraction of 0.026 at a doping temperature of 1300° C.
Figure 3:
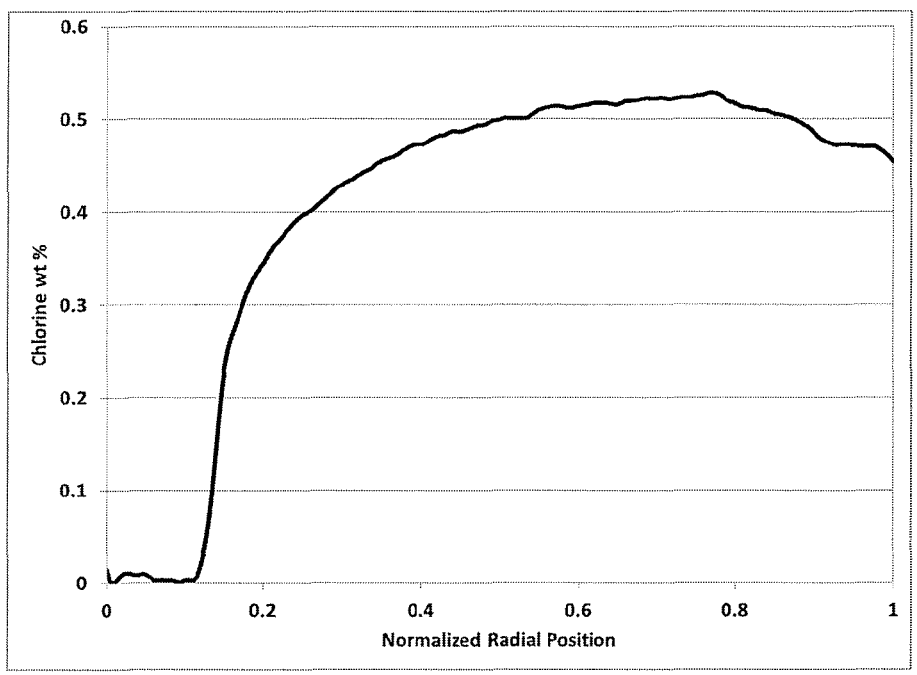
FIG. 3 is a plot of chlorine concentration of the optical preform layer manufactured by exposing a silica soot layer to a gas mixture having $SiCl_4$ mole fraction of 0.02 at a doping temperature of 1250° C.
Figure 4:
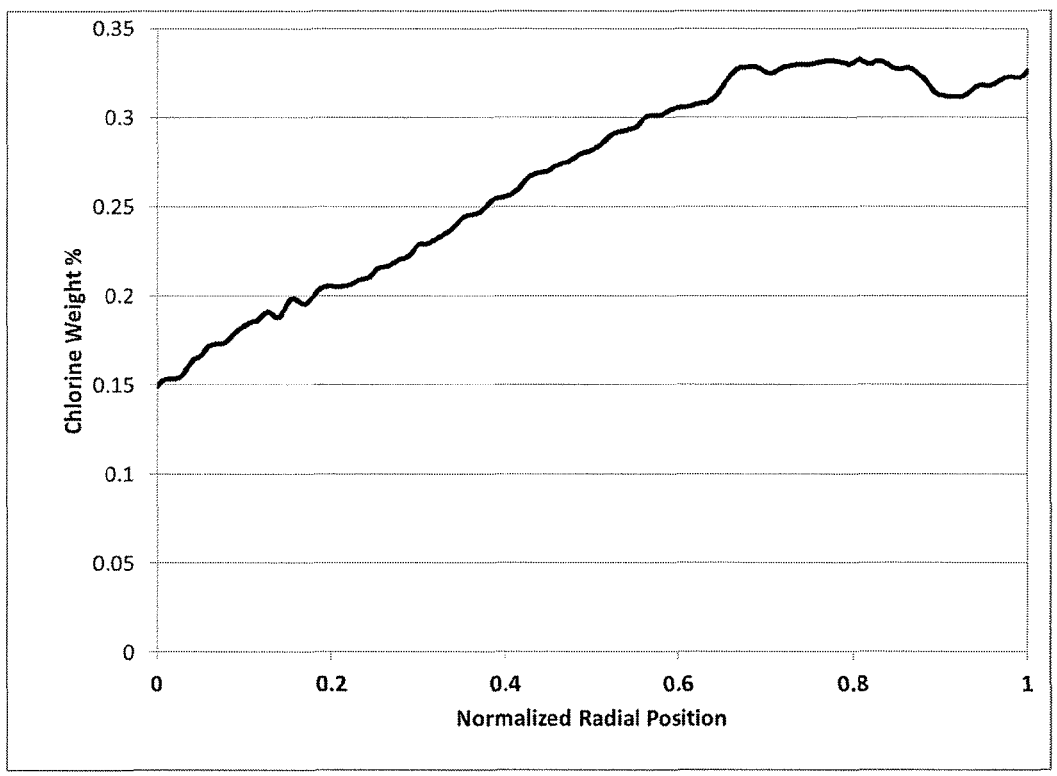
FIG. 4 is a plot of chlorine concentration of the optical preform layer manufactured by exposing a silica soot layer to a gas mixture having $SiCl_4$ mole fraction of 0.02 at a doping temperature of 1250° C.

For example, in some embodiments, to achieve the doping levels in the outer cladding layer 3 to produce the exemplary optical fiber index profiles described above, we determined that it is preferable to have the $SiCl_4$ dopant mole fraction of greater than 0.001 but less than of less than 0.03 in the gas mixture that is used to dope porous silica soot layer with chlorine. Furthermore, we realized that because of the efficient reaction of $SiCl_4$ with silica to chlorine dope the silica soot layer, the effective diffusivity of the SiCl$_4$ dopant is significantly reduced from its pore diffusivity, where pore diffusivity is defined as the SiCl$_4$ diffusivity in the pores of soot layer in absence of any reaction. The ratio of the SiCl$_4$ effective diffusivity to pore diffusivity is described by parameter X, wherein parameter X is given as:

$$X = \frac{D_{eff}}{D_{pore}} = \frac{1}{1 + \left[\left(\frac{\rho}{\rho_s - \rho}\right)\frac{0.21 T_{dop}\mathrm{Exp}[-5435.33/T_{dop}]}{y_{SiCl4}^{3/4}}\right]}$$

where $D_{eff}$ is the effective diffusivity of the SiCl$_4$ through the pores of the soot preform and includes the impact of chlorine doping reaction on diffusivity, $D_{pore}$ is the pore diffusivity of the SiCl$_4$ through the pores of the soot preform in absence of any reaction, $\rho$ is the average density of the soot layer (g/cm$^3$), $\rho_s$ is the density of fully densified soot layer (~2.2 g/cm$^3$ for the case of silica soot), $T_{dop}$ is the doping temperature (furnace temperature) at which doping with SiCl$_4$ is performed and $y_{SiCl4}$ is the mole fraction of the SiCl$_4$ in the gas mixture that is used for doping. The radial uniformity of the doped chlorine level is strongly influenced by the effective diffusivity of SiCl$_4$ and therefore by parameter X. For the case when SiCl$_4$ effective diffusivity is small, the diffusional limitations are present that result in higher amount of SiCl$_4$ doping on the outside portion (i.e., the outmost portion) of the soot layer that is being doped compared to the inner location (e.g., inner most portion) in the soot layer. For example, FIG. 2 illustrates chlorine profiles resulted when silica soot layer of an optical fiber preform was exposed to a gas mixture having SiCl$_4$ mole fraction of 0.026 at the doping temperature of 1300° C. (measured in gases directly adjacent to the preform), followed by complete consolidation/sintering in SiCl$_4$ free environment at a temperature above 1450° C. (Normalized position of 0 corresponds to the inner most location of the chlorine doped layer (i.e., the inner most portion of the chlorine doped layer)). As can be seen, there is a significant non-uniformity in this doped chlorine profile, which negatively impact product attributes. Conversely, higher effective diffusivity (and therefore larger value of X) results in greater penetration of the SiCl$_4$ dopant through the porous soot preform resulting in more uniform doping levels. FIG. 3 illustrates chlorine profile that resulted when silica soot layer of an optical fiber preform is exposed to a gas mixture having SiCl$_4$ mole fraction of 0.02 at the doping temperature of 1250° C. followed by complete consolidation/sintering in SiCl$_4$ free environment at a temperature above 1450° C. FIG. 3 shows that non-uniform chlorine doped behavior in terms of radial doped profile is also observed for the doping temperature of 1250° C. and SiCl$_4$ mole fraction of 0.02. In comparison, chlorine doped profiles that are substantially more uniform were obtained when doping the silica soot layer with of SiCl$_4$ mole fraction of 0.02 at 1125° C. (see, for example, FIG. 4).

We discovered that good radial and axial uniformity of Cl doping concentration is achieved for the combinations of the parameters in Eq [1] (soot layer density, doping temperature; and SiCl$_4$ mole fraction in the gas mixture used for chlorine doping the soot layer) that result in parameter X having values larger than 0.029, preferably 0.03 or larger, more preferably larger than 0.035 and even more preferably larger than 0.04. Preferably, the average soot density of the soot layer that is being treated with SiCl$_4$ is between 0.3 gm/cm$^3$ and 1 gm/cm$^3$, more preferably between 0.4 gm/cm$^3$ and 0.8 gm/cm$^3$, and even more preferably between 0.4 gm/cm$^3$ and 0.7 gm/cm$^3$. In some embodiments, for the chlorine doping levels needed in outer cladding region 3 of the profile shown in FIG. 1, the mole fraction of SiCl$_4$ in the gas mixture for chlorine doping is preferably less than 0.03 and even more preferably less than 0.0275. In these embodiments, the mole fraction of SiCl$_4$ in the gas mixture to be used for chlorine doping is preferably larger than 0.005, more preferably larger than 0.01 and even more preferably larger than 0.015. In some embodiments the doping temperature is less than 1200° C., more preferably less than 1175° C. and even more preferably less than 1150° C. but greater than 1000° C. (The doping temperature furnace temperature or gas temperature right next to the preform). The exposure time of the soot layer to the gas mixture comprising the SiCl$_4$ dopant is preferably greater than 30 minutes, more preferably greater than 60 minutes and even more preferably greater than 90 minutes (but for example, less than 10 hrs). Tables 1A to 1D show exemplary values of parameter X for different combinations of doping temperatures T=T$_{dop}$, and SiCl$_4$ mole fractions for soot layer density is 0.44 gm/cm$^3$. The bolded values represent the preferable range of X values (i.e., X values of 0.03 and higher). Applicants discovered that when X>0.03 non-uniformities in radial and axial chlorine doping levels are reduced. Applicants discovered that when X>0.05 non-uniformities in radial and axial chlorine doping levels are even further reduced. It is observed that for values of SiCl$_4$ mole fraction, $y_{SiCl4}$>0.03, the values of parameter X is generally higher than 0.03 for most doping temperatures of interest, which can results in a non-uniformity.

TABLE 1A

| SiCl$_4$ Mole Fraction | X at T = 1000° C. | X at T = 1025° C. | X at T = 1050° C. | X at T = 1075° C. | X at T = 1100° C. | X at T = 1125° C. |
|---|---|---|---|---|---|---|
| 0.003 | 0.014 | 0.012 | 0.011 | 0.010 | 0.009 | 0.008 |
| 0.005 | 0.020 | 0.018 | 0.016 | 0.015 | 0.013 | 0.012 |
| 0.008 | 0.027 | 0.024 | 0.022 | 0.020 | 0.018 | 0.017 |
| 0.010 | 0.033 | 0.030 | 0.027 | 0.025 | 0.022 | 0.021 |
| 0.013 | 0.039 | 0.035 | 0.032 | 0.029 | 0.026 | 0.024 |
| 0.015 | 0.044 | 0.040 | 0.036 | 0.033 | 0.030 | 0.028 |
| 0.018 | 0.049 | 0.044 | 0.040 | 0.037 | 0.034 | 0.031 |
| 0.020 | 0.054 | 0.049 | 0.045 | 0.041 | 0.037 | 0.034 |
| 0.023 | 0.059 | 0.053 | 0.048 | 0.044 | 0.041 | 0.037 |
| 0.025 | 0.063 | 0.057 | 0.052 | 0.048 | 0.044 | 0.040 |
| 0.028 | 0.067 | 0.061 | 0.056 | 0.051 | 0.047 | 0.043 |
| 0.030 | 0.072 | 0.065 | 0.059 | 0.054 | 0.050 | 0.046 |

TABLE 1B

| SiCl$_4$ Mole Fraction | X at T = 1150° C. | X at T = 1175° C. | X at T = 1200° C. | X at T = 1225° C. | X at T = 1250° C. |
|---|---|---|---|---|---|
| 0.003 | 0.008 | 0.007 | 0.007 | 0.006 | 0.006 |
| 0.005 | 0.011 | 0.010 | 0.010 | 0.009 | 0.008 |
| 0.008 | 0.015 | 0.014 | 0.013 | 0.012 | 0.011 |
| 0.010 | 0.019 | 0.017 | 0.016 | 0.015 | 0.014 |
| 0.013 | 0.022 | 0.021 | 0.019 | 0.018 | 0.016 |
| 0.015 | 0.026 | 0.024 | 0.022 | 0.020 | 0.019 |
| 0.018 | 0.029 | 0.026 | 0.024 | 0.023 | 0.021 |
| 0.020 | 0.031 | 0.029 | 0.027 | 0.025 | 0.023 |
| 0.023 | 0.034 | 0.032 | 0.029 | 0.027 | 0.025 |
| 0.025 | 0.037 | 0.034 | 0.032 | 0.029 | 0.027 |
| 0.028 | 0.040 | 0.037 | 0.034 | 0.031 | 0.029 |
| 0.030 | 0.042 | 0.039 | 0.036 | 0.033 | 0.031 |

TABLE 1C

| SiCl4 Mole Fraction | X at T = 1000° C. | X at T = 1025° C. | X at T = 1050° C. | X at T = 1075° C. | X at T = 1100° C. | X at T = 1125° C. |
|---|---|---|---|---|---|---|
| 0.04 | 0.087 | 0.080 | 0.073 | 0.067 | 0.061 | 0.056 |
| 0.07 | 0.127 | 0.116 | 0.107 | 0.098 | 0.090 | 0.083 |
| 0.1 | 0.160 | 0.147 | 0.135 | 0.124 | 0.115 | 0.106 |
| 0.13 | 0.188 | 0.173 | 0.160 | 0.147 | 0.136 | 0.126 |
| 0.16 | 0.213 | 0.197 | 0.182 | 0.168 | 0.155 | 0.144 |
| 0.19 | 0.236 | 0.218 | 0.202 | 0.187 | 0.173 | 0.161 |
| 0.22 | 0.256 | 0.237 | 0.220 | 0.204 | 0.189 | 0.176 |
| 0.25 | 0.275 | 0.255 | 0.237 | 0.220 | 0.205 | 0.191 |
| 0.28 | 0.292 | 0.271 | 0.252 | 0.235 | 0.219 | 0.204 |
| 0.31 | 0.308 | 0.287 | 0.267 | 0.249 | 0.232 | 0.217 |
| 0.34 | 0.323 | 0.301 | 0.281 | 0.262 | 0.245 | 0.229 |
| 0.37 | 0.337 | 0.315 | 0.294 | 0.275 | 0.257 | 0.240 |

TABLE 1D

| SiCl4 Mole Fraction | X at T = 1150° C. | X at T = 1175° C. | X at T = 1200° C. | X at T = 1225° C. | X at T = 1250° C. |
|---|---|---|---|---|---|
| 0.04 | 0.052 | 0.048 | 0.044 | 0.041 | 0.038 |
| 0.07 | 0.077 | 0.071 | 0.066 | 0.061 | 0.057 |
| 0.1 | 0.098 | 0.091 | 0.084 | 0.079 | 0.073 |
| 0.13 | 0.117 | 0.108 | 0.101 | 0.094 | 0.088 |
| 0.16 | 0.134 | 0.124 | 0.116 | 0.108 | 0.101 |
| 0.19 | 0.150 | 0.139 | 0.130 | 0.121 | 0.113 |
| 0.22 | 0.164 | 0.153 | 0.143 | 0.133 | 0.125 |
| 0.25 | 0.178 | 0.166 | 0.155 | 0.145 | 0.136 |
| 0.28 | 0.190 | 0.178 | 0.166 | 0.156 | 0.146 |
| 0.31 | 0.202 | 0.189 | 0.177 | 0.166 | 0.156 |
| 0.34 | 0.214 | 0.200 | 0.188 | 0.176 | 0.165 |
| 0.37 | 0.225 | 0.211 | 0.197 | 0.185 | 0.174 |

In one embodiment, the uniformity of doped chlorine concentration (uniformity of the doped chlorine profile) is improved by compensating the lower SiCl$_4$ concentration at the inner locations of the soot layer (due to the diffusional limitation as the SiCl$_4$ is exposed from outside) by having the inner locations of the soot layer at higher temperatures during the SiCl$_4$ exposure step, than the outer locations of the soot layer. Since the preform is heated in a consolidation/sintering furnace from outside, the soot layer generally is heated from outside to inside, with the temperature at the outer location higher than the inside locations. To achieve the doping conditions where the temperature at the inside locations of the soot layer (e.g., at the location of 1 mm wide inner most region or portion of this layer) are higher than the temperature at the outer locations (e.g., higher than the temperatures of the outer most 1 mm portion/region of this layer), the soot layer is initially heated from outside at (furnace) temperatures above 1250° C. As the inside locations of the soot layer heats and reaches a temperature T$_{inside}$ that is higher than T$_{dop}$, wherein the doping temperature T$_{dop}$ is chosen for a choice of soot layer density ρ and SiCl$_4$ mole fraction y$_{SiCl4}$ such that the parameter X is larger than 0.03, more preferably larger than 0.04 and even more preferably larger than 0.05, the temperature of the furnace is lowered to T$_{dop}$ and the soot layer is exposed to a doping environment comprising of a gas mixture with SiCl$_4$ (i.e., SiCl$_4$ exposure step) having mole fraction y$_{SiCl4}$. The difference between T$_{inside}$ and T$_{dop}$ is preferably higher than 25° C., more preferably higher than 35° C. and even more preferably higher than 40° C. The difference between T$_{inside}$ and T$_{dop}$ is preferably smaller than 80° C., more preferably smaller than 60° C. and even more preferably smaller than 50° C. Preferably T$_{inside}$ is less than 1250° C., more preferably less than 1225° C. and even more preferably less than 1200° C.

In another embodiment, the mole fraction of the SiCl$_4$ is increased during the exposure of the soot layer to the gas stream comprising the SiCl$_4$ dopant. The SiCl$_4$ mole fraction in the gas stream at the end of the SiCl$_4$ exposure process is preferably at least 1.25 times the SiCl$_4$ mole fraction at the beginning of the SiCl$_4$ exposure process, more preferably at least 1.5 times the SiCl$_4$ mole fraction at the beginning of the SiCl$_4$ exposure process, and even more preferably at least 2 times the SiCl$_4$ mole fraction at the beginning of the SiCl$_4$ exposure process. In yet another embodiment, the uniformity of doped chlorine concentration (uniformity of the doped chlorine profile) is improved by compensating the lower SiCl$_4$ concentration at the inner locations of the soot layer (due to the diffusional limitation as the SiCl$_4$ is exposed from outside) by having the inner locations of the soot layer at temperatures that are 25° C. to 80° C. higher than the doping temperature T$_{dop}$ during the SiCl$_4$ exposure, with the SiCl$_4$ mole fraction at the end of the SiCl$_4$ exposure process at least 1.5 times higher than the SiCl$_4$ mole fraction at the beginning of the SiCl$_4$ exposure process during the SiCl$_4$ exposure of the soot layer to the gas stream comprising the SiCl$_4$ dopant. In these different embodiments, the soot layer is preferably pre-dried by exposure to mixture of chlorine and helium gas (comprising chlorine between 1% and 5%) prior to exposure of the soot layer to the gas stream comprising the SiCl$_4$ dopant.

In yet another embodiment, the soot preform is initially treated with SiCl$_4$ containing gas at a temperature at which no appreciable silica chlorination reaction takes place. This initial treatment temperature is preferably less than 900° C. such that SiCl$_4$ is able to successfully diffuse to the inner regions of the soot layer. The temperature of the soot layer is subsequently increased to temperatures above 1000° C. and the SiCl₄ already diffused in then reacts with silica to chlorine dope it.

The resultant chlorine concentration on the inside edge of the outer-cladding layer of the preform (and thus that of outer cladding layer 3 of the optical fiber) is greater than 40% of the maximum chlorine concentration in the outer cladding layer, more preferably greater than 50% of the maximum chlorine concentration in the outer cladding layer, and even more preferably greater than 75% of the maximum chlorine concentration in the outer cladding layer. The uniformity of the profile helps with reducing excess stress in the core and inner-cladding, which helps in lowering fiber attenuation. The uniformity of the profile also improves the optical performance of the fiber, including the bend performance of the optical fiber.

According to some embodiments, the step of exposing a silica based preform with at least one porous glass region to SiCl₄ at temperature $T_{dop}$ below 1250° C. also includes simultaneously exposing the silica based preform with at least one porous glass region to carbon monoxide (CO) gas for at least part of the SiCl₄ exposure process. In some embodiments, for part of the SiCl₄ doping process, use of SiCl₄ in combination with CO is also disclosed that helps in effective dehydration of the outer-cladding layer, as well as reducing the non-bridging oxygen defect concentrations in the outer cladding layer. The concentration of CO used may be between 0 and 10000 ppm by volume, more preferably between 500 and 6000 ppm by volume and even more preferably between 1000 and 4000 ppm by volume. The fiber made with such a method exhibit attenuation at 1550 nm that is less than 0.185 dB/km at 1550 and a bend loss for a 20 mm mandrel diameter that is less than 0.1 dB/turn.

The invention is further illustrated using following examples.

Example 1

Figure 5:
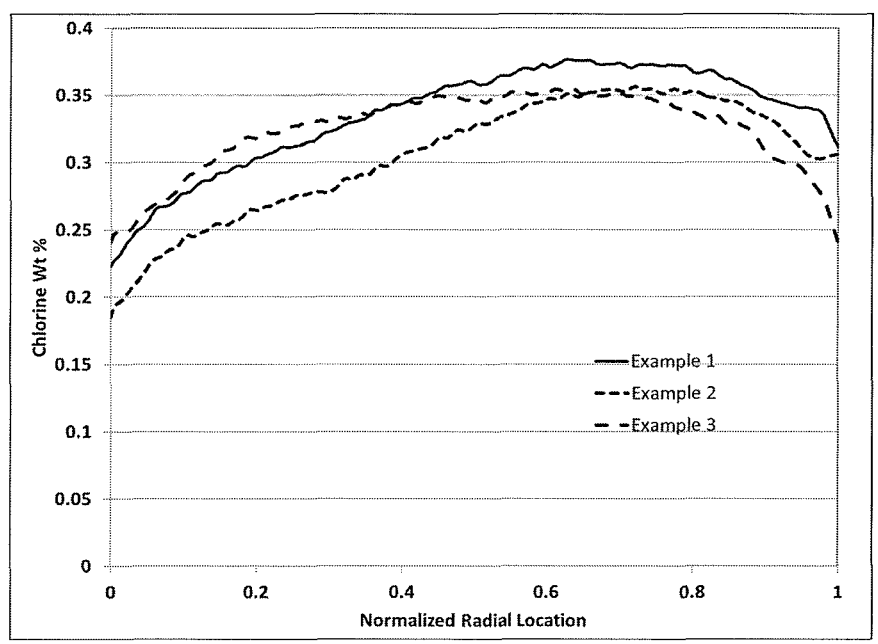
FIG. 5 illustrates uniform chlorine concentration in Cl doped outer layers of three embodiments of optical fiber preforms doped according to one embodiment of the present invention.

A soot layer was pre-heated from outside at a furnace temperature of 1275° C. For part of the pre-heat step, the soot layer was treated with a mixture of chlorine and helium comprising 1-2% chlorine. When the inside of the soot-layer heats up to 1175° C., the temperature of the furnace is dropped to 1125° C. The soot layer is subsequently treated with a gas stream with SiCl₄ mole fraction of 0.02 for 4.3 hrs. The soot layer is then sintered to fully dense glass in a SiCl₄ free environment at a temperature higher than 1450° C. The chlorine doped profile in the fully densified glass is shown in FIG. 5 (solid line).

Example 2

A soot layer was pre-heated from outside at a furnace temperature of 1275° C. For part of the pre-heat step, the soot layer was treated with a mixture of chlorine and helium comprising 1-2% chlorine. When the inside of the soot-layer heats up to 1050° C., the temperature of the furnace is dropped to 1125° C. The soot layer is subsequently treated with a gas stream with SiCl₄ mole fraction of 0.02 for 2.3 hrs. The soot layer is then sintered to fully dense glass in a SiCl₄ free environment at a temperature higher than 1450° C. The chlorine doped profile in the fully densified glass is shown in FIG. 5 (curve with small dashes).

Example 3

A soot layer was pre-heated from outside at a furnace temperature of 1275° C. For part of the pre-heat step, the soot layer was treated with a mixture of chlorine and helium comprising 1-2% chlorine. When the inside of the soot-layer heats up to 1175° C., the temperature of the furnace is dropped to 1125° C. The soot layer is subsequently treated with a gas stream comprising SiCl₄ for 2 hours with SiCl₄ mole fraction increasing from 0.023 at the beginning of the SiCl₄ gas stream exposure to 0.04 at the end of the SiCl₄ gas stream exposure. The soot layer is then sintered to fully dense glass in a SiCl₄ free environment at a temperature higher than 1450° C. The chlorine doped profile in the fully densified glass is shown in FIG. 5 (curve with larger dashes).

Preferably the chlorine doped preform is sintered at the temperatures above 1400° C. to completely sinter the preform, for example such that its glass density is at least 2.2 g/cm³.

Accordingly, in at least some of the embodiments a method of making an optical fiber preform comprises the steps of:
(i) exposing a silica based preform with at least one porous glass region having soot density of ρ to a gas mixture comprising SiCl₄ having SiCl₄ mole fraction $y_{SiCl4}$ of less than 0.03 at a doping temperature $T_{dop}$ such that parameter X is larger than 0.03 to form the chlorine treated preform, wherein $$X = \cfrac{1}{1 + \left[\left(\cfrac{\rho}{\rho_s - \rho}\right)\cfrac{0.21 T_{dop}\text{Exp}[-5435.33/T_{dop}]}{y_{SiCl4}^{3/4}}\right]}$$

and $\rho_s$ is the density of the fully densified soot layer; and
(ii) exposing the chlorine treated preform to temperatures above 1400° C. to completely sinter the preform to produce sintered optical fiber preform with a chlorine doped region having a chlorine doped profile.

Preferably, X>0.03, more preferably X>0.04. Preferably the ratio of the concentration of doped chlorine in the inside (e.g., a 1 mm wide inner most portion) of the Cl doped region to maximum concentration of doped chlorine in the Cl doped region is >0.4, more preferably >0.5, and even more preferably X>0.75. In some embodiments the ratio of the concentration of chlorine in the inside portion of the Cl doped region (e.g., the 1 mm wide inner most portion of the Cl doped region) to concentration of chlorine in the outer portion of the Cl doped region (e.g., the 1 mm wide outer most portion of the Cl doped region)) is >0.4. Preferably $T_{dop}$ is less than 1225° C., more preferably less than 1200° C. and even more preferably less than 1175° C. Preferably, the mole fraction of SiCl₄ in the gas mixture (in carrier gas) $y_{SiCl4}$ is larger than 0.005, more preferably larger than 0.01, and in some embodiments larger than 0.015.

In at least some embodiments, the difference between $T_{inside}$ and $T_{dop}$ is less than 80° C., in some embodiments less than 60° C. In some embodiment wherein the soot layer that is being doped with Cl is exposed to carbon monoxide, wherein the concentration of carbon monoxide is between 0 and 10000 ppm by volume in the gas mixture. ($T_{dop}$ is doping temperature of the gas(es) directly surrounding (and in contact with) the preform.)

According to some embodiment the method of making an optical fiber preform comprises the steps of: (i) exposing a silica based preform with at least one porous glass region having soot density of ρ<0.8 gm/cm³ to a gas mixture comprising SiCl₄ having SiCl₄ mole fraction $y_{SiCl4}$ of less than 0.03 at a doping temperature $T_{dop}$<1225° C.; and (ii) exposing the chlorine treated preform to temperatures above 1400° C. to completely sinter the preform to produce sintered optical fiber preform with a chlorine doped region having a chlorine doped profile. In the embodiments disclosed herein ρ<0.8 gm/cm³, preferably ρ<0.6 gm/cm³, for example ρ<0.6 gm/cm³, or ρ<0.6 gm/cm³, and in some embodiments ρ<0.5 gm/cm³.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of making an optical fiber preform comprising the steps of:
   (i) exposing a silica based preform with at least one porous glass region of silica based soot with soot density of ρ at a doping temperature $T_{dop}$ to a gas mixture comprising $SiCl_4$ and having $SiCl_4$ mole fraction $y_{SiCl4}$ such that parameter X is larger than 0.101 to form a chlorine (Cl) treated preform with Cl doped region, wherein $$X = \frac{1}{1 + \left[\left(\frac{\rho}{\rho_s - \rho}\right)\frac{0.21 T_{dop} \text{Exp}[-5435.33/T_{dop}]}{y_{SiCl4}^{3/4}}\right]}$$

$\rho_s$ is the density of the fully densified soot layer and $\rho < \rho_s$; and
   (ii) exposing the chlorine treated preform to temperatures above 1400° C. to completely sinter the chlorine treated preform and producing a sintered optical fiber preform with a chlorine doped region having a chlorine doped profile.

2. The method of making an optical fiber preform according to claim 1, wherein said step of exposing the chlorine treated preform to temperatures above 1400° C. to completely sinter the chlorine treated preform is performed in essentially $SiCl_4$ free environment.

3. The method of making an optical fiber preform according to claim 1, wherein chlorine doping profile of the Cl doped region is such that the ratio of the concentration of doped chlorine in an inner portion of the Cl doped region to maximum concentration of doped chlorine in the Cl doped region is ≥0.4.

4. The method of making an optical fiber preform according to claim 1, wherein chlorine doping profile is such that the ratio of the concentration of doped chlorine in the inner portion of the Cl doped region to concentration of doped chlorine in the outer portion of the Cl doped region is ≥0.75.

5. The method of making an optical fiber preform according to claim 1, wherein $T_{dop}$ is less than 1225° C.

6. The method of making an optical fiber preform according to claim 1, wherein $T_{dop}$ is less than 1200° C.

7. The method of making an optical fiber preform according to claim 1, wherein the mole fraction of $SiCl_4$ in the gas mixture $y_{SiCl4}$ is larger than 0.005.

8. The method of making an optical fiber preform according to claim 1, wherein the mole fraction of $SiCl_4$ in the gas mixture $y_{SiCl4}$ is larger than 0.015.

9. A method of making an optical fiber preform according to claim 1, wherein the parameter X is not less than 0.15.

10. The method of making an optical fiber preform according to claim 1, wherein the parameter X is not less than 0.2.

11. The method of making an optical fiber preform according to claim 1, wherein the parameter X is not less than 0.301.

12. A method of making an optical fiber preform comprising the steps of:
    (i) making a glass preform comprising of a core region and a first cladding region;
    (ii) overcladding the glass preform with silica soot overclad layer having silica soot with soot density ρ, thereby forming a silica soot overclad layer;
    (iii) exposing the silica soot overclad layer at a doping temperature $T_{dop}$ to a gas mixture comprising $SiCl_4$ and having $SiCl_4$ mole fraction $y_{SiCl4}$ such that parameter X is larger than 0.101 to form a chlorine (Cl) treated preform with Cl doped overclad region, wherein $$X = \frac{1}{1 + \left[\left(\frac{\rho}{\rho_s - \rho}\right)\frac{0.21 T_{dop} \text{Exp}[-5435.33/T_{dop}]}{y_{SiCl4}^{3/4}}\right]}$$

$\rho_s$ is the density of the fully densified soot layer and $\rho < \rho_s$; and
    (iv) exposing the chlorine treated preform to temperatures above 1400° C. to completely sinter the chlorine treated preform and producing a sintered optical fiber preform with a chlorine doped overclad region having a chlorine doped profile, wherein the chlorine doped overclad region comprises chlorine in an amount greater than 2000 ppm by weight.

* * * * *

UNITED STATES PATENT AND TRADEMARK OFFICE
CERTIFICATE OF CORRECTION

PATENT NO. : 9,676,658 B2
APPLICATION NO. : 14/997780
DATED : June 13, 2017
INVENTOR(S) : Brian Lee Harper et al.

It is certified that error appears in the above-identified patent and that said Letters Patent is hereby corrected as shown below:

On the Title Page

In Column 1, item (54), Title, Line 3, delete "TERTRACHLORIDE" and insert -- TETRACHLORIDE --, therefor.

In the Specification

In Column 1, Line 3, delete "TERTRACHLORIDE" and insert -- TETRACHLORIDE --, therefor.

Signed and Sealed this
Eighth Day of August, 2023

Katherine Kelly Vidal
*Director of the United States Patent and Trademark Office*